United States Patent
Liu

(10) Patent No.: US 11,924,947 B2
(45) Date of Patent: Mar. 5, 2024

(54) METHOD OF USING STEREO RECORDING TO CONTROL THE FLASHING OF CENTRAL LAMPS

(71) Applicant: AMERICAN FUTURE TECHNOLOGY, City of Industry, CA (US)

(72) Inventor: You-Chi Liu, City of Industry, CA (US)

(73) Assignee: AMERICAN FUTURE TECHNOLOGY, City Of Industry, CA (US)

( * ) Notice: Subject to any disclaimer, the term of this patent is extended or adjusted under 35 U.S.C. 154(b) by 139 days.

(21) Appl. No.: 17/721,829

(22) Filed: Apr. 15, 2022

(65) Prior Publication Data
US 2022/0369443 A1    Nov. 17, 2022

(30) Foreign Application Priority Data
May 11, 2021    (TW) ................................ 110116973

(51) Int. Cl.
| | |
|---|---|
| *H05B 47/155* | (2020.01) |
| *G06F 3/16* | (2006.01) |
| *G10L 19/16* | (2013.01) |
| *H04S 1/00* | (2006.01) |
| *H05B 47/165* | (2020.01) |

(52) U.S. Cl.
CPC ............. *H05B 47/155* (2020.01); *G06F 3/16* (2013.01); *G10L 19/16* (2013.01); *H04S 1/007* (2013.01); *H05B 47/165* (2020.01); *H04S 2400/15* (2013.01)

(58) Field of Classification Search
CPC ............................ H05B 47/155; H05B 47/165
See application file for complete search history.

(56) References Cited

U.S. PATENT DOCUMENTS

| | | | |
|---|---|---|---|
| 2019/0079556 A1* | 3/2019 | Choi | H04R 9/04 |
| 2021/0339132 A1* | 11/2021 | Shakespeare | A63F 13/537 |
| 2022/0369442 A1* | 11/2022 | Liu | H05B 47/18 |

* cited by examiner

*Primary Examiner* — Adi Amrany
(74) *Attorney, Agent, or Firm* — Muncy, Geissler, Olds & Lowe, P.C.

(57) ABSTRACT

A method of using stereo recording to control the flashing of central lamps includes the steps of: providing left and right channel microphones in a stereo sound source venue or electronic device, and recording the plural sound sources generated by the left area, central area and right area of the stereo sound source, then storing the recorded analog signal in an audio signal sampling unit of a signal processing device, and then converting the sound signal into a light flashing formula to obtain a light flashing parameter value. According to the light flashing parameter value of the operation control unit, the left side lamps, the central lamps and the right side lamps respectively form staggered flashing, so that the flashing light set produces light changes corresponding to the music rhythm and vocals.

5 Claims, 4 Drawing Sheets

Provide left and right channel microphones in a stereo sound source venue or electronic device, and record multiple sound sources generated by the left area, central area and right area of said stereo sound source, and then store the recorded analog signal in an audio signal sampling unit of a signal processing device. —41

Use an audio signal amplifier to amplify the analog signal stored in said audio signal sampling unit and use an analog-to-digital converter to convert the analog signal into a digital signal. —42

Use an operation control unit to capture the digital signal, and then separate the digital signal into left and right channel signals, then, use software calculation to enhance the digital signal according to the recorded signal strength of the left channel signal and the right channel signal respectively and based on the sound source recorded in the central area by the left and right channels, and then convert the sound signal into a light flashing formula to obtain a light flashing parameter value. The sound signal converting into a light flashing formula further comprises a central lamp driving algorithm whose formula is: $N1=(A+B)-(B+C)=AB+2B+AC+BC=2A+4B+2C$.
Then, multiply the previous result by itself: $N=N1 \times N1=(2A+4B+2C) \times (2A+4B+2C)=4A+16B+4C$.
Because the value of B is much larger than the values of A and C, the action of B can directly drive the central lamp N to act. —43

The operation control unit transmits control commands to a left/right lamp driving unit and a central lamp driving unit respectively according to the light flashing parameter value. —44

Use the left/right lamp driving unit to drive a left side lamp and a right side lamp of a flashing light set to flash, and use the central lamp driving unit to drive a central lamp of the flashing light set to flash, so that the flashing light set generates light changes corresponding to the music rhythm and human voice as the left side lamp, central lamp and right side lamp form staggered flashing. —45

*FIG.3*

METHOD OF USING STEREO RECORDING TO CONTROL THE FLASHING OF CENTRAL LAMPS

This application claims the priority benefit of Taiwan patent application number 110116973, filed on May 11, 2021.

BACKGROUND OF THE INVENTION

1. Field of the Invention

The present invention relates to a method of using stereo recording to control the flashing of central lamps, in particular, it refers to a weighted ratio operation of the central area sound source of a stereo sound source venue or an electronic device to strengthen the flashing frequency of the central lamps of a flashing light set, so that the viewers of the flashing light set interact more closely with the lead singer on the music stage according to the flashing frequency, and the linkage between the music and the light is optimized.

2. Description of the Related Art

In order to pursue a higher level of sensory enjoyment, the hearing brought by the pure music rhythm has been difficult to meet people's sensory needs. Therefore, more and more music devices are designed to give more visual experience to provide audiences with more different atmospheres in the process of listening to music. However, most of the music and lighting interactive devices are controlled by lighting manufacturers through a fixed program preset by the system. The specific method is to adjust the color and brightness of the light with the performance of the music in the program in advance, or adjust the color and brightness of the light through the style and rhythm of the music, and then broadcast it at the same time when the performance is performed.

However, this kind of preset fixed program cannot make the combination of music and lighting achieve the most suitable effect, and at the same time, the rhythm of the music and the flashing of the lights may be inconsistent, resulting in poor sensory experience of the audience and reducing the live music atmosphere. In addition, when there are too many music tracks, lighting manufacturers will spend more time arranging, so they will not provide exclusive lighting interaction for each track. Moreover, at present, lighting manufacturers change the position of the light based on the two parameters of the volume of the sound and the frequency of the music, so as to adjust the color and brightness of the light. However, adjusting the above two parameters will make the light interaction too chaotic, resulting in a bad experience. Returning to the origin of the combination of music and lighting, people feel that the combination of music changes because of the rhythm in the music, and the rhythm is the reflection of the time, order, and strength of the music. Only through the rhythm can the music proceed in an orderly manner to produce the optimal experience. At the same time, the lead singer in the center of the stage is the focus of everyone's attention, and his every move drives the atmosphere of the audience. If the light can be flashed according to lead singer's singing rhythm, it can better grasp the live atmosphere.

SUMMARY OF THE INVENTION

The present invention has been accomplished under the circumstances in view. It is the main object of the present invention to provide a method of using stereo recording to control the flashing of central lamps, which comprises the steps as follows. Provide left and right channel microphones in a stereo sound source venue or electronic device, and record multiple sound sources generated by the left area, central area and right area of the stereo sound source. The recorded analog signal is stored in an audio signal sampling unit of a signal processing device, and the sound signal is converted into a light flashing formula to obtain a light flashing parameter value. The sound signal converting into a light flashing formula further comprises a central lamp driving algorithm whose formula is: N1=(A+B)−(B+C)=AB+2B+AC+BC=2A+4B+2C. Then, multiply the previous result by itself: N=N1×N1=(2A+4B+2C)×(2A+4B+2C)=4A+16B+4C. The basis for the signal strength of the central channel signal to be displayed through the central lamps is: Because the value of B is much larger than the values of A and C, the action of B can directly drive the central lamp N to generate action. According to the light flashing parameter value of the operation control unit, the left side lamps, the central lamps and the right side lamps respectively form staggered flashing, so that the flashing light set produces light changes corresponding to the rhythm of the music and the human voice. By means of the above-mentioned device and method, the central area sound source (especially the lead singer) of the stereo sound source (especially the music stage) can be subjected to an weighted ratio operation to enhance the flashing frequency of the central lamps of the flashing light set, so that the viewers of the flashing light set can interact more closely with the lead singer on the music stage according to the flashing frequency, and the linkage between the music and the light can be optimized.

The sound signal converting into a light flashing formula comprises a left/right lamp driving algorithm and the formula of the left/right lamp driving algorithm is as follows:

$$L=A+B;$$

$$R=B+C;$$

$$L-R=(A+B)-(B+C);$$

$$L-R=A-C;$$

The basis for the signal strength of the left channel signal to be displayed through the left side lamps is: if A−C is a positive number, L will act, and when the positive number is larger, the left side lamps farther to the left side will flash.

The basis for the signal strength of the right channel signal to be displayed through the right side lamps is: if A−C is a negative number, then R will act, and when the negative number is larger, the right side lamps farther to the right side will flash.

In the above, L means that one or more left side lamps flash;

R means one or more right side lamps flash;
A is the sound source of the left area;
B is the sound source of the central area; and
C is the sound source of the right area.

It is another object of the present invention to provide a method of using stereo recording to control the flashing of central lamps, wherein the left side lamps, the central lamps and the right side lamps of the flashing light set are oval-shaped annular lamps, and the interiors of the three are all provided with complex light-emitting diodes (LEDs) that are capable of converting complex colors.

It is still another object of the present invention to provide a method of using stereo recording to control the flashing of central lamps, wherein the signal processing device refers to a personal computer, a notebook computer, a tablet computer or a smart phone.

It is still another object of the present invention to provide a method of using stereo recording to control the flashing of central lamps, wherein the operation control unit refers to a central processing unit or a micro control unit.

Other advantages and features of the present invention will be fully understood by reference to the following specification in conjunction with the accompanying drawings, in which like reference signs denote like components of structure.

BRIEF DESCRIPTION OF THE DRAWINGS

FIG. 3 is a flow chart of a method of using stereo recording to control the flashing of central lamps of the present invention.

DETAILED DESCRIPTION OF THE PREFERRED EMBODIMENT

Figure 1:
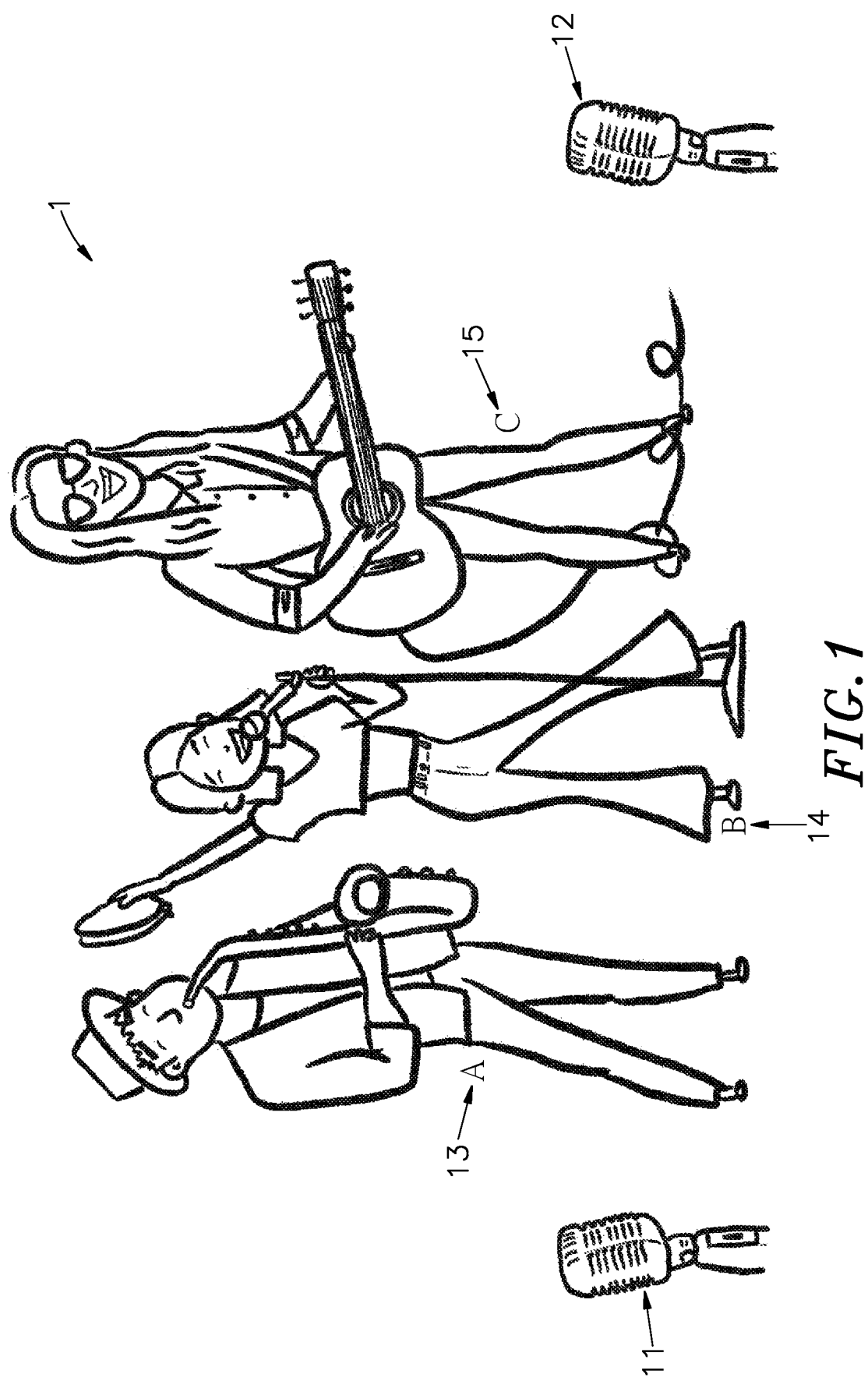
FIG. 1 is a configuration diagram of a recording device in a stereo sound source according to the present invention.
Figure 2:
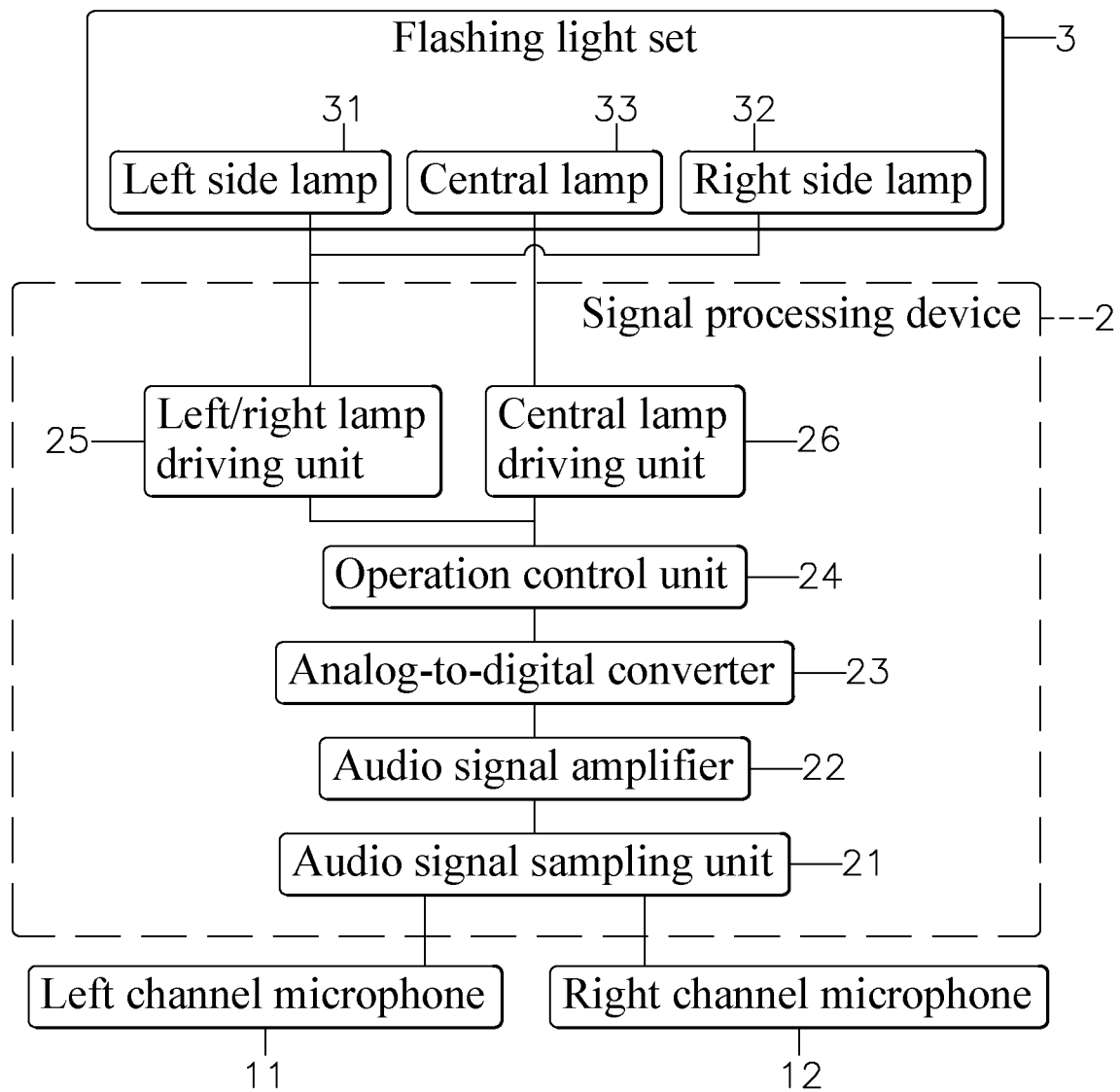
FIG. 2 is a functional block diagram of a system for converting sound into light according to the present invention.
Figure 4:
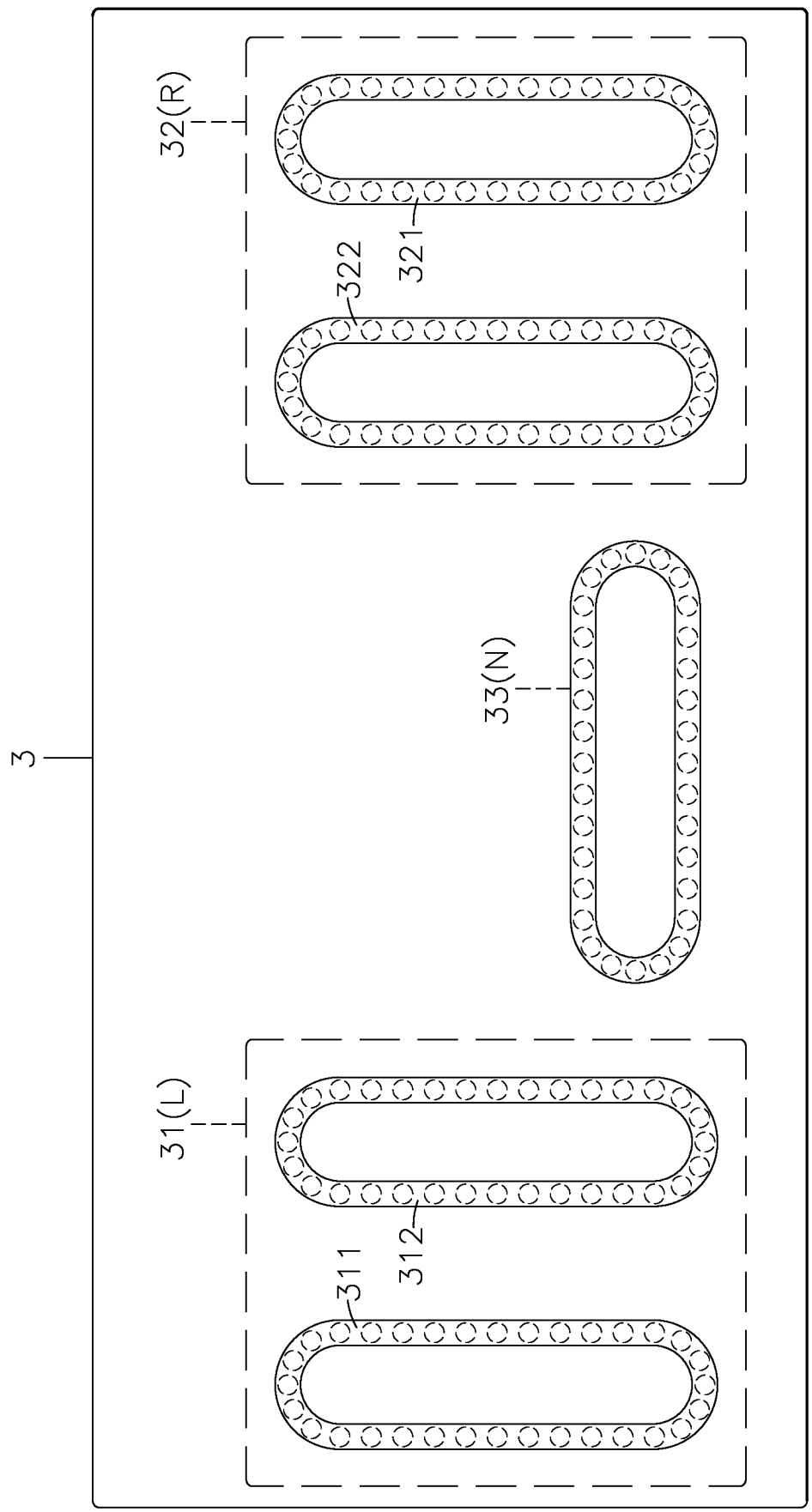
FIG. 4 is a structural diagram of a flashing light set of the present invention.

Referring to FIGS. 1, 2 and 4, as can be clearly seen from the drawings, a system for converting sound into light according to the present invention mainly comprises a stereo sound source 1, a signal processing device 2 and a flashing light set 3, and its main components and features are detailed as follows:

Please refer to FIG. 1, wherein a left channel microphone 11 and a right channel microphone 12 are arranged on the ground of a stereo sound source 1 (here, a concert venue is used as an example, but not limited to this, and the stereo sound source 1 can also be any electronic device that can play music, such as: audio equipment, personal computer, notebook computer, tablet computer or smartphone) to record the plural sound sources generated by the left area 13, the central area 14 and the right area 15 of the stereo sound source 1. For example: the left area 13 of the stereo sound source 1 has a saxophonist of an orchestra, which becomes the sound source A of the left area; in the central area 14 of the stereo sound source 1, there is a lead singer of the orchestra, which becomes the sound source B of the central area; there is a guitarist of the orchestra in the right area 15 of the stereo sound source 1, which becomes the sound source C of the right area. According to the aforementioned configuration, the recorded analog signal can be stored in an audio signal sampling unit 21 of the signal processing device 2.

During the above process of recording the stereo sound source 1 with the left channel microphone 11 and the right channel microphone 12, in most audio equipment or audio software, the state of outputting 100% power is defined as 0 decibels (dB), so all output volumes are expressed in the range of 0 decibels to negative decibels (−dB). The sound source A of the nearest left area recorded by the left channel microphone 11 is about −3 decibels (dB); the sound source B of the central area of the next nearest position is about −10 decibels (dB); the sound source C of the farthest right area is about −12 to −18 decibels (dB). Since the sound sources in the aforementioned areas have different volumes, a distinction can be clearly made. Similarly, the sound source C of the right area at the nearest position recorded by the right channel microphone 12 is about −3 decibels (dB); the sound source B of the central area at the next closest position is about −10 decibels (dB); the sound source A of the left area at the farthest position is about −12 to −18 decibels (dB). According to the volume recorded by the left channel microphone 11, the signal processing device 2 can use the volume about −3 decibels (dB) as the sound source A of the left area; then according to the volume recorded by the right channel microphone 12, the volume is about −3 decibels (dB) as the sound source C of the right area; finally, according to the left channel microphone 11 and the right channel microphone 12, the collective recording volume is about −10 decibels (dB) as the sound source B of the central area, and stored in the audio signal sampling unit 21.

Please refer to FIG. 2, after the audio signal sampling unit 21 of the signal processing device 2 stored the analog signal recorded by the left channel microphone 11 and the right channel microphone 12, the analog signal is amplified by an audio signal amplifier 22 of the signal processing device 2, and then converted into a digital signal by an analog-to-digital converter 23 (ADC). Then, an operation control unit 24 is used to capture the digital signal and separate the digital signal into left and right channel signals. According to the recorded signal strength of the left channel signal and the right channel signal, and based on the sound source recorded in the central area at the same time by the left and right channels, it is strengthened through software calculation, and the sound signal is converted into a light flashing formula to obtain a light flashing parameter value. The operation control unit 24 transmits control commands to a left/right lamp driving unit 25 and a central lamp driving unit 26 respectively according to the light flashing parameter value. The aforementioned signal processing device 2 refers to a personal computer (PC), a notebook computer (Notebook), a tablet computer (Table PC) or a smart phone, and the operation control unit 24 refers to a central processing unit (CPU) or a micro control unit (MCU).

As mentioned above, the left/right lamp driving unit 25 can drive left side lamps 31 and right side lamps 32 of a flashing light set 3 to flash. The central lamp driving unit 26 is used to drive a central lamp 33 of the flashing light set 3 to flash. At the same time, when one or more left side lamps flash, it is defined as the aforementioned conversion of the sound signal into the L of the light flashing formula; when one or more right side lamps flash, it is defined as the aforementioned conversion of the sound signal into the R of the light flashing formula; when one or more central lamps flash, it is defined as the aforementioned conversion of the sound signal into the N of the light flashing formula.

The structure of the flashing light set 3 is as shown in FIG. 4. The left side lamps 31, the central lamp 33 and the right side lamps 32 are oval-shaped annular lamps, and the interiors of the three are all provided with complex light-emitting diodes (LEDs) that can convert complex colors. The left side lamps 31 further include a first left lamp 311 and a second left lamp 312. When the value of the positive number calculated by the aforementioned light flashing parameter value is larger, the first left lamp 311 near the outer side can be driven to flash. Conversely, when the value of the positive number calculated by the light flashing parameter value is smaller, the second left lamp 312 close to the inner side can be driven to flash. In addition, the right side lamps 32 further include a first right lamp 321 and a second right lamp 322. When the value of the negative number calculated by the aforementioned light flashing parameter value is larger, the first right lamp 321 near the outer side can be driven to flash. Conversely, when the value of the negative number calculated by the light flashing parameter value is smaller, the second right lamp 322 close to the inner side can be driven to flash.

Please refer to FIG. 3, which is a flowchart of the method of using stereo recording to control the flashing of central lamps of the present invention, which includes the following steps:

Step 41: Perform a recording operation on a stereo sound source venue or an electronic device that generates a plurality of sound position sources, and store the recorded analog signal in an audio signal sampling unit of a signal processing device.

Step 42: The analog signal stored in the audio signal sampling unit is amplified by an audio signal amplifier, and then converted into a digital signal by an analog-to-digital converter.

Step 43: Use an operation control unit to capture the digital signal, and then separate the digital signal into left and right channel signals, then, according to the recorded signal strength of the left channel signal and the right channel signal respectively, and based on the sound source recorded in the central area by the left and right channels, it is enhanced through software calculation, and the sound signal is converted into a light flashing formula to obtain a light flashing parameter value.

Step 44: The operation control unit transmits control commands to a left/right lamp driving unit and a central lamp driving unit respectively according to the light flashing parameter value.

Step 45: Use the left/right lamp driving unit to drive a left side lamp and a right side lamp of a flashing light set to flash; use the central lamp driving unit to drive a central lamp of the flashing light set to flash, so that the flashing light set generates light changes corresponding to the music rhythm and human voice as the left side lamp, the central lamp and the right side lamp form staggered flashing.

In the above Step 43, converting the sound signal into a light flashing formula further comprises a left/right lamp driving algorithm and a central lamp driving algorithm.

The above left/right lamp driving algorithm, its formula is as follows:

$$L=A+B;$$

this formula means to ignore the sound source C of the farthest right area $$R=B+C;$$

this formula means to ignore the sound source A of the farthest left area $$L-R=(A+B)-(B+C);$$

$$L-R=A-C;$$

The basis for the signal strength of the left channel signal to be displayed through the left side lamps is: if A−C is a positive number, L will act, and when the positive number is larger, the left side lamps farther to the left side will flash;

The basis for the signal strength of the right channel signal to be displayed through the right side lamps is: if A−C is a negative number, then R will act, and when the negative number is larger, the right side lamps farther to the right side will flash;

In the above, L means that one or more left side lamps flash;
R means one or more right side lamps flash;
A is the sound source of the left area;
B is the sound source of the central area;
C is the sound source of the right area.

The above central lamp N driving algorithm, its formula is as follows:

$$N1=(A+B)-(B+C)=AB+2B+AC+BC=2A+4B+2C;$$

Multiply the above result by itself $$N=N1 \times N1=(2A+4B+2C) \times (2A+4B+2C)=4A+16B+4C;$$

The basis for the signal strength of the central channel signal to be displayed through the central lamp is: Because the value of B is much larger than the values of A and C, the action of B can directly drive the central lamp N to act;
N means that one or more central lamps flash;
N1 refers to the operation parameter of central lamp;
A is the sound source of the left area;
B is the sound source of the central area;
C is the sound source of the right area.

The above formula is mainly aimed at the lead singer in the center of the stage, so that the central lamps 33 of the flashing light set 3 flashes in accordance with the rhythm of his singing, and can better grasp the live atmosphere.

The main feature of the present invention is that the left side lamps 31 and the right side lamps 32 of the flashing light set 3 are driven to flash according to the left/right lamp driving unit 25. In addition, the central lamps 33 is driven by the central lamp driving unit 26 to flash, because the left side lamps 31 and the right side lamps 32 are one group and the central lamps 33 is another group. The two groups of lamps are controlled by different driving units respectively, so it can increase the richness of light flashing. For the central area sound source B (especially the lead singer) of the stereo sound source 1 (especially the music stage), the weighted ratio operation is carried out to strengthen the flashing frequency of the central lamps 33 of the flashing light set 3, so that the viewer of flashing light set 3 can more closely interact with the lead singer on the music stage according to the flashing frequency, and the linkage between the music and the light can be optimized.

Through the disclosure of the above-mentioned FIGS. 1 to 4, it can be understood that the present invention is a method of using stereo recording to control the flashing of central lamps, comprising the following steps:

Provide left and right channel microphones in a stereo sound source venue or an electronic device, and record multiple sound sources generated by the left area, central area and right area of the stereo sound source. The recorded analog signal is stored in an audio signal sampling unit of a signal processing device, and the sound signal is converted into a light flashing formula to obtain a light flashing parameter value. The sound signal converting into a light flashing formula further comprises a central lamp driving algorithm whose formula is: N1=(A+B)−(B+C)=AB+2B+AC+BC=2A+4B+2C. Then, multiply the previous result by itself: N=N1×N1=(2A+4B+2C)×(2A+4B+2C)=4A+16B+4C. The basis for the signal strength of the central channel signal to be displayed through the central lamp is: Because the value of B is much larger than the values of A and C, the action of B can directly drive the central lamp N to generate action. According to the light flashing parameter value of the operation control unit, the left side lamps, the central lamps and the right side lamps respectively form staggered flashing, so that the flashing light set produces light changes corresponding to the rhythm of the music and the human voice. By means of the above-mentioned device and method, the central area sound source (especially the lead singer) of the stereo sound source (especially the music stage) can be subjected to an weighted ratio operation to enhance the flashing frequency of the central lamps of the flashing light set, so that the viewers of the flashing light set can interact more closely with the lead singer on the music stage according to the flashing frequency, and the linkage between the music and the light can be optimized. The present invention is applied in interactive equipment such as music and lighting in concerts, and has excellent practicability, so a patent application is filed to seek patent protection.

What the invention claimed is:

1. A method of using stereo recording to control the flashing of central lamps, comprising the steps of:
   a: providing left and right channel microphones in a stereo sound source venue or electronic device, and recording multiple sound sources generated by the left area, central area and right area of said stereo sound source, and then storing the recorded analog signal in an audio signal sampling unit of a signal processing device;
   b: using an audio signal amplifier to amplify the analog signal stored in said audio signal sampling unit and using an analog-to-digital converter to convert the analog signal into a digital signal;
   c: using an operation control unit to capture the digital signal, and then separating the digital signal into left and right channel signals, then, using software calculation to enhance the digital signal according to the recorded signal strength of the left channel signal and the right channel signal respectively and based on the sound source recorded in the central area by the left and right channels, and then converting the sound signal into a light flashing formula to obtain a light flashing parameter value,
   the sound signal converting into a light flashing formula comprising a central lamp driving algorithm and the formula of said central lamp driving algorithm being as follows:

$N1=(A+B)-(B+C)=AB+2B+AC+BC=2A+4B+2C;$ multiplying the above result by itself $N=N1 \times N1=(2A+4B+2C) \times (2A+4B+2C)=4A+16B+4C;$ the basis for the signal strength of a central channel signal to be displayed through a central lamp being: because the value of B is much larger than the values of A and C, the action of B can directly drive said central lamp N to act, where
   N means that one or more central lamps flash,
   N1 refers to the operation parameter of central lamp,
   A is the sound source of the left area,
   B is the sound source of the central area,
   C is the sound source of the right area;
   d: said operation control unit transmitting control commands to a left/right lamp driving unit and a central lamp driving unit respectively according to said light flashing parameter value; and
   e: using said left/right lamp driving unit to drive a left side lamp and a right side lamp of a flashing light set to flash, and using said central lamp driving unit to drive a central lamp of said flashing light set to flash, so that said flashing light set generates light changes corresponding to the music rhythm and human voice as said left side lamp, said central lamp and said right side lamp form staggered flashing.

2. The method of using stereo recording to control the flashing of central lamps as claimed in claim 1, wherein in Step c:
   the sound signal converting into a light flashing formula comprising a left/right lamp driving algorithm and the formula of said left/right lamp driving algorithm being as follows:

$L=A+B;$ $R=B+C;$ $L-R=(A+B)-(B+C);$ $L-R=A-C;$ the basis for the signal strength of the left channel signal to be displayed through the left side lamps is: if A−C is a positive number, L will act, and when the positive number is larger, the left side lamps farther to the left side will flash;
   the basis for the signal strength of the right channel signal to be displayed through the right side lamps is: if A−C is a negative number, then R will act, and when the negative number is larger, the right side lamps farther to the right side will flash;
   in the above, L means that one or more left side lamps flash;
   R means one or more right side lamps flash;
   A is the sound source of the left area;
   B is the sound source of the central area;
   C is the sound source of the right area.

3. The method of using stereo recording to control the flashing of central lamps as claimed in claim 1, wherein the left side lamps, the central lamps and the right side lamps of said flashing light set are oval-shaped annular lamps, and the interiors of the three are all provided with complex light-emitting diodes (LEDs) that are capable of converting complex colors.

4. The method of using stereo recording to control the flashing of central lamps as claimed in claim 1, wherein said signal processing device refers to a personal computer, a notebook computer, a tablet computer or a smart phone.

5. The method of using stereo recording to control the flashing of central lamps as claimed in claim 1, wherein said operation control unit refers to a central processing unit or a micro control unit.

* * * * *